US008882365B2

(12) United States Patent
Xie et al.

(10) Patent No.: US 8,882,365 B2
(45) Date of Patent: Nov. 11, 2014

(54) HIGH PERFORMANCE QUICK TERMINAL ASSEMBLY FOR OPTICAL FIBER

(75) Inventors: Cansheng Xie, Guangdong (CN); Zhenhong Zheng, Guangdong (CN); Zhanhui Wang, Guangdong (CN)

(73) Assignees: Chaozhou-Three-Circle (Group) Co., Ltd., Guangdong (CN); Nanchong Three-Circle Electronics Co., Ltd., Sichuan (CN)

( * ) Notice: Subject to any disclaimer, the term of this patent is extended or adjusted under 35 U.S.C. 154(b) by 0 days.

(21) Appl. No.: 13/818,768

(22) PCT Filed: Dec. 21, 2011

(86) PCT No.: PCT/CN2011/084312
§ 371 (c)(1),
(2), (4) Date: Feb. 25, 2013

(87) PCT Pub. No.: WO2013/063845
PCT Pub. Date: May 10, 2013

(65) Prior Publication Data
US 2013/0330046 A1     Dec. 12, 2013

(30) Foreign Application Priority Data

Nov. 4, 2011    (CN) .......................... 2011 1 0345399

(51) Int. Cl.
*G02B 6/255*     (2006.01)
*G02B 6/38*      (2006.01)
*G02B 6/36*      (2006.01)

(52) U.S. Cl.
CPC .............. *G02B 6/381* (2013.01); *G02B 6/3696* (2013.01); *G02B 6/3846* (2013.01); *G02B 6/382* (2013.01); *G02B 6/3652* (2013.01); *G02B 6/3644* (2013.01); *G02B 6/3858* (2013.01)
USPC ................................. 385/78; 385/81; 385/83

(58) Field of Classification Search
CPC .... G02B 6/3696; G02B 6/381; G02B 6/3846; G02B 6/382; G02B 6/3652; G02B 6/3644; G02B 6/3858
USPC .......................................... 385/33–34, 53–83
See application file for complete search history.

(56) References Cited

U.S. PATENT DOCUMENTS 5,845,026 A * 12/1998 Lee et al. .......................... 385/58
6,293,708 B1 * 9/2001 Ohtsuka et al. ................. 385/72
(Continued)

FOREIGN PATENT DOCUMENTS

CN       201780393 U     3/2011
CN       102081204 A     6/2011
(Continued)

OTHER PUBLICATIONS

International Search Report for PCT/CN2011/084312, Search completed Jul. 30, 2012.

*Primary Examiner* — Ellen Kim
(74) *Attorney, Agent, or Firm* — Pearne & Gordon LLP

(57) ABSTRACT

The present invention discloses a high performance quick terminal assembly for optical fiber, comprising a ferrule and an inner bore inside the ferrule. The inner bore is exposed after part of the cylinder body of the ferrule is cut away, forming a connecting platform. Pre-embedded optical fiber and connecting optical fiber are connected in the inner bore of the connecting platform, and the connecting platform is disposed with a pressing device to compress the connecting point of the two optical fibers. The invention uses high precision inner bore of the ceramic ferrule to replace the existing V-shaped groove. It can be easily, efficiently and effectively installed and is cost saving. Meanwhile excellent optical performance and high reliability are achieved. The problem related to various failure or badness of the prior art are resolved in the present invention.

9 Claims, 2 Drawing Sheets

(56) References Cited

U.S. PATENT DOCUMENTS

| | | | |
|---|---|---|---|
| 8,529,138 B2* | 9/2013 | Duis et al. ........................ | 385/59 |
| 2003/0077035 A1 | 4/2003 | Deng et al. | |
| 2006/0193565 A1* | 8/2006 | Sasaki et al. .................... | 385/65 |
| 2010/0226611 A1 | 9/2010 | Goto et al. | |

FOREIGN PATENT DOCUMENTS

| | | |
|---|---|---|
| CN | 201892767 U | 7/2011 |
| CN | 102169212 A | 8/2011 |

\* cited by examiner

HIGH PERFORMANCE QUICK TERMINAL ASSEMBLY FOR OPTICAL FIBER

FIELD OF THE INVENTION

The present invention is related to a high performance quick terminal assembly for optical fiber, more particularly, to a quick terminal assembly for a variety of pre-embedded optical fibers.

BACKGROUND OF THE INVENTION

At present, along with the rapid development of optical fiber communication technology, PON access technology has become a main solution for FTTH. However, with respect to the installation work in the final 1 kilometer, the costs, convenience, efficiency, excellent optical performance and high reliability are essential.

With respect to FTTH connection, conventional fiber welding technology cannot be promoted in a larger area due to the high costs, limited space and high requirement for professional trainings. Consequently, the optical fiber terminal technology has become the best solution for FTTH access because of its convenience, efficiency and effectiveness.

The current quick terminal assemblies are generally straight-way type (i.e. straight insert or dry type) or pre-embedded style. Straight-way type quick terminal assemblies have no stable performance due to the limitation of the prior art. They cannot meet the requirements of FTTH. Generally, as to pre-embedded quick terminal assemblies, one end of the fiber and the ceramic ferrule are polished to be an end for connection of common connectors. The other end of the fiber is exposed with a certain length. The exposed part is mounted in a V-shaped groove, which is provided with a block to fix the connection between the access optical fiber and the pre-embedded optical fiber. During the connection, the gel is pre-disposed in the V-shaped groove and fiber locking device is provided. However, there are many problems in the prior art, such as, 1). as one end of the pre-embedded optical fiber is exposed out of the ferrule, it is likely to be broken; 2). the V-shaped groove is not made with high precision, the connecting optical fiber cannot be coaxially connected, leading to high insertion loss; 3). the V-shaped groove and the ferrule are made separately and fixed by adhesive. The product reliability is ensured along with the temperature change; 4). the product material is likely to age or deform after long-term service; and 5). the one-time successful rate is low on site assembly and 10% needs second assembly.

SUMMARY OF THE INVENTION

In view of the above-mentioned problems, it is one objective of the present invention to provide a high performance quick terminal assembly for optical fiber. A high precision inner bore of the ceramic ferrule is used to replace the existing plastic V-shaped groove. It can be easily and rapidly installed with low costs, excellent optical performance and high reliability. The present invention completely solves the problem that quick terminal assemblies may fail or become abnormal.

To achieve the above objective, a high performance quick terminal assembly for optical fiber, comprising a ferrule and an inner bore inside the ferrule, is provided in the present invention, wherein the inner bore is exposed a after part of the cylinder body of the ferrule is cut away, forming a connecting platform. Pre-embedded optical fiber and connecting optical fiber are connected in the inner bore of the connecting platform, and the connecting platform is provided with a pressing device to compress the connecting point of the two optical fibers.

In the present invention, the pre-embedded optical fiber and connecting optical fiber are connected in the inner bore so as to prevent the pre-embedded optical fiber from being damaged after being exposed. In addition, the connecting platform and the ferrule are integrally formed, and thus is easily manufactured and more reliable. By the pressing device and the bound effect of the inner bore itself, the problem that is likely to occur in the prior art, i.e., the insertion loss of optical fiber is high due to the transplacement or tilt of the optical fiber during the connection, is resolved in the present invention.

Further, the pressing device includes a pressing block used for pressing the connecting point and a tightening sheath used for fixing the block.

Further, the pressing block is provided with a groove for accommodation and protection of matching gel, for protection of the optical fibers. The gel is likely to be volatilized or lost after long term of usage, therefore it can be complemented at any time. Meanwhile, it ensures that enough gel is available for multi-times connection of the optical fiber.

The access ends of the ferrule and the pressing block are respectively provided with an optical fiber import hole. Specifically, one end of the ferrule is an end for a conventional connector and the other end is provided with a V-shaped import hole, for the optical fiber to pass through the inner bore conveniently.

Connecting point set at the inner bore of the ceramic core inset is used in the present invention, to replace the conventional V-shaped groove. Advantages of the invention are summarized as follows:

1. The high performance quick terminal assembly for optical fiber has excellent optical performance and high reliability.
2. In the whole processing stage, the pre-embedded optical fiber is protected within the ferrule from damage, so that its quality is ensured and costs are reduced. While with respect to the conventional quick optical fiber connectors, the pre-embedded optical fiber is exposed and it is easily broken during the assembly, and meanwhile, the end surface of the optical fiber is likely to be damaged or stuck with dirt, bring possible failure when connected.
3. The connecting point of the two fibers is a C-shaped groove formed by high precision inner bore of the ceramic ferrule. The inner bore can be high-precision formed, i.e., within a tolerance of 1 um, so that the loss is lower than 0.1 dB after the two optical fibers are connected.
4. The ferrule at the connecting point will not deform or fail under external force. While the V-shaped groove made by organic materials is likely to deform or fail under the external force or compression of the spring.
5. The block groove is provided with enough gel, which can be complemented after multi-times of connection or long-term usage.
6. One-time successful rate for site assembly is high and the performance is excellent.

Figure 1:
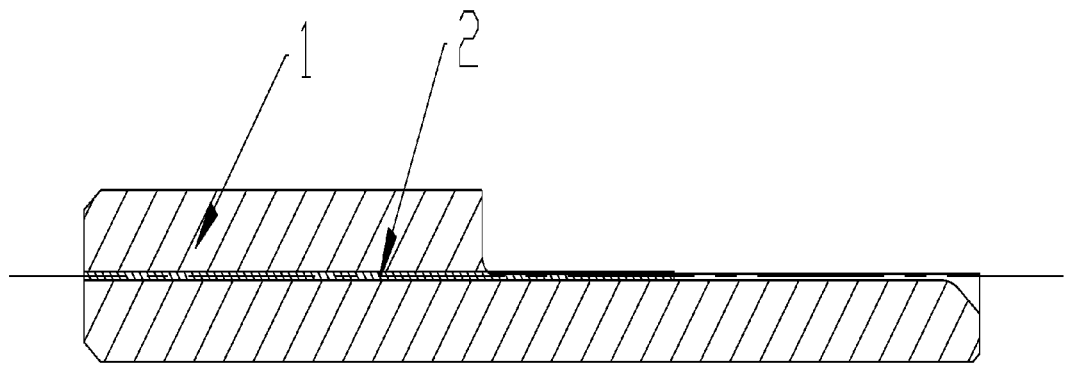
FIG. 1 is a schematic diagram of the pre-embedded optical fiber within the ferrule of the processed quick terminal assembly.

In the drawings:
1: ferrule
2: pre-embedded optical fiber
3: tightening sheath
4: pressing block
5: groove
6: matching gel
7: connecting point
8: connecting optical fiber
9: connecting platform

DETAILED DESCRIPTION OF THE EMBODIMENTS

Figure 2:
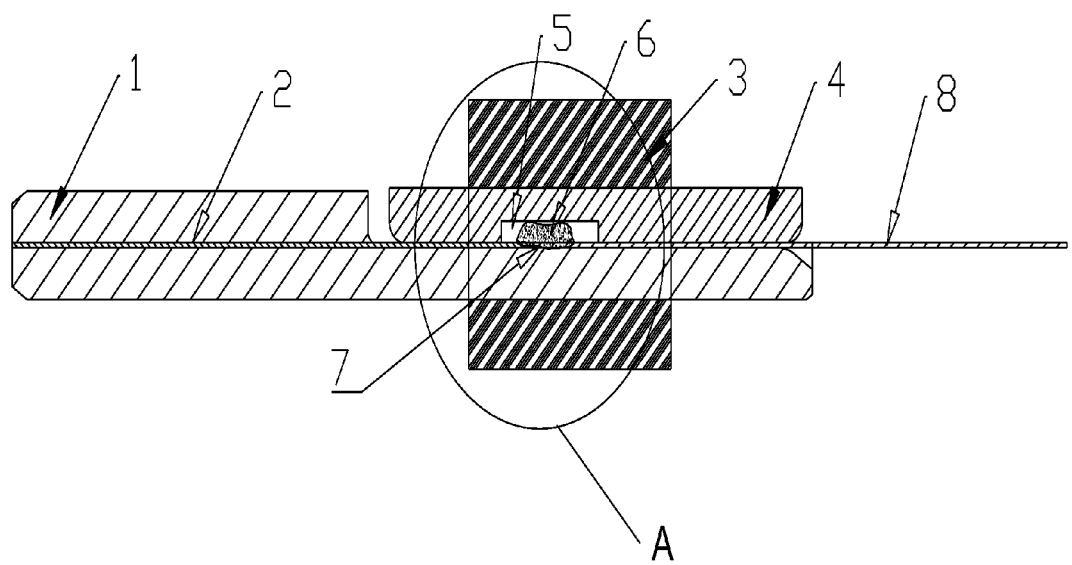
FIG. 2 is a schematic diagram of the pressing block compressing the connected fibers on the connecting platform of the ferrule, after the fibers are connected.
Figure 3:
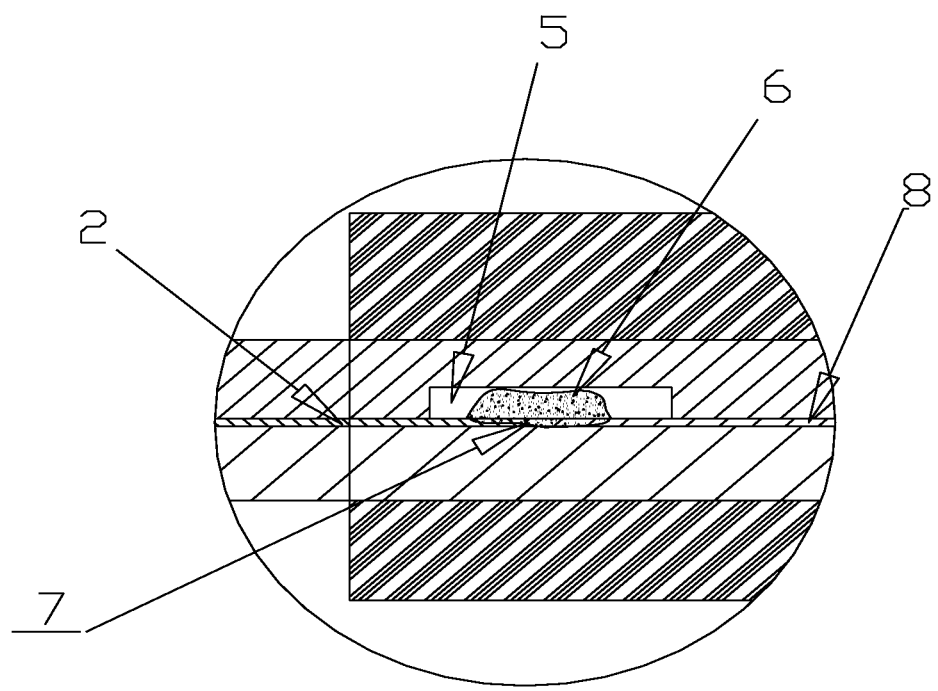
FIG. 3 is an enlarged view of part A of FIG. 2.

As shown in FIGS. 1, 2 and 3, a high performance quick terminal assembly for optical fiber comprising a ferrule 1 and an inner bore inside the ferrule 1, is provided. The exposed inner bore is exposed after part cylinder body of the ferrule 1 is cut away, forming a connecting platform 9. Pre-embedded optical fiber 2 and connecting optical fiber 8 are connected at the inner bore of the connecting platform 9. The connecting platform 9 is provided with a pressing device to compress the connecting point 7 of the two optical fibers. Specifically, the pressing device includes a pressing block 4 used to press the connecting point and a tightening sheath 3 used to fix the block 4.

The ferrule provided in the invention can be processed by polishing and grinding the moulds that are made by extrusion process or injection molding process. Their shapes can be modified by grinder cutter or etching process. The diameter error of the inner bore of the ferrule is controlled within 1 um. Such size can be easily achieved by existing processing techniques. The diameter of the inner bore is 1 um larger than the diameter of the optical fiber; therefore the connecting optical fiber can easily pass through. The coaxial connection is achieved within 1 um so as to ensure that insertion loss caused during the connection of optical fibers is lower than 0.1 dB.

A pre-embedded optical fiber 2 is connected within the inner bore of the ferrule 1. One end of the pre-embedded optical fiber 2 and the end surface of the ferrule 1 are connected with normal connectors after being polished. The other end of the pre-embedded optical fiber must be clean before being buried and the connecting end is positioned on the connecting platform 9.

The block 4 is provided with a groove 5 to accommodate and protect the matching gel 6 for protection of optical fibers. The end surface of the pre-embedded optical fiber 2 is provided with enough gel 6. When the connecting optical fiber 8 enters into the connecting platform 9 to be connected with the pre-embedded optical fiber 2, the pressing block 4 and the connecting platform 9 of the ferrule 1 are closed together under the effect of the tightening sheath 3. The connecting optical fiber 8 is coaxial connected in the inner bore of the connecting platform 9.

The invention claimed is:

1. A high performance quick terminal assembly for optical fiber, comprising:
   a ferrule and an inner bore inside the ferrule, wherein the inner bore is exposed after part of the cylinder body of the ferrule is cut away, forming a connecting platform;
   pre-embedded optical fiber and connecting optical fiber are connected in the inner bore of the connecting platform,
   the connecting platform is provided with a pressing device for compression the connecting point of the two optical fibers, and
   a C-shaped groove formed by the inner bore of the ferrule.

2. The high performance quick terminal assembly for optical fiber according to claim 1, wherein the ferrule is made of ceramics, metal, glass or plastic.

3. The high performance quick terminal assembly for optical fiber according to claim 1, wherein the end surface and external diameter of the ferrule are grinded to be suitable for conventional connectors such as PC, APC or LC connector.

4. The high performance quick terminal assembly for optical fiber according to claim 1, wherein the pressing device includes a pressing block used for pressing the connecting point, and a tightening sheath used for fixing the pressing block.

5. The high performance quick terminal assembly for optical fiber according to claim 1, wherein the pressing block and the tightening sheath are made of ceramics, metal, glass or plastic.

6. The high performance quick terminal assembly for optical fiber according to claim 1, wherein the block is disposed with a groove to accommodate and protect matching gel for fibers.

7. The high performance quick terminal assembly for optical fiber according to claim 1, wherein the access ends of the ferrule and the pressing block are respectively provided with an optical fiber import hole.

8. The high performance quick terminal assembly for optical fiber according to claim 1, wherein the pre-embedded optical fiber and the connecting optical fiber are directly connected in the same plane.

9. The high performance quick terminal assembly for optical fiber according to claim 1, wherein diameter of the C-shaped groove matches the outer diameter of the connecting optical fiber.

* * * * *